US009200751B2

(12) United States Patent
Guo et al.

(10) Patent No.: US 9,200,751 B2
(45) Date of Patent: *Dec. 1, 2015

(54) PRE-COVER-OPENING POWER-OFF METHOD AND APPARATUS

(71) Applicant: Shanxi Quan'an New Technology Development Co., Ltd., Jiexiu, Shanxi (CN)

(72) Inventors: Chunping Guo, Jiexiu (CN); Xiaoyan Guo, Jiexiu (CN); Xiaopeng Guo, Jiexiu (CN)

(73) Assignee: Shanxi Quan'an New Technology Development Co., Ltd., Jiexiu, Shanxi (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/551,677

(22) Filed: Nov. 24, 2014

(65) Prior Publication Data

US 2015/0123805 A1  May 7, 2015

Related U.S. Application Data

(63) Continuation of application No. 12/996,282, filed as application No. PCT/CN2009/000428 on Apr. 22, 2009, now Pat. No. 8,902,075.

(30) Foreign Application Priority Data

Jun. 19, 2008 (CN) .......................... 2008 1 0055240

(51) Int. Cl.
*G08B 21/00* (2006.01)
*F16P 3/08* (2006.01)
(Continued)

(52) U.S. Cl.
CPC ................. *F16P 3/08* (2013.01); *G08B 21/185* (2013.01); *E05B 1/00* (2013.01); *G07C 1/00* (2013.01); *H01H 9/22* (2013.01)

(58) Field of Classification Search
CPC ..................................... E05B 1/00; G07C 1/00
See application file for complete search history.

(56) References Cited

U.S. PATENT DOCUMENTS

| 5,587,759 A | 12/1996 | Kurata |
| 7,237,412 B1 | 7/2007 | Huang |

(Continued)

FOREIGN PATENT DOCUMENTS

| CN | 2166194 Y | 5/1994 |
| CN | 2526416 Y | 12/2002 |

(Continued)

OTHER PUBLICATIONS

Canadian Office Action issued for Application No. 2719030, dated Feb. 28, 2012 (pages).

(Continued)

*Primary Examiner* — Shirley Lu
(74) *Attorney, Agent, or Firm* — Wilmer Cutler Pickering Hale and Dorr LLP

(57) ABSTRACT

A pre-cover-opening power-off method, comprising the steps of: (a) fixing a bolt casing to a bolt; (b) connecting a motion sensor to a safety protecting and monitoring unit in a wired or wireless manner; and (c) activating the motion sensor to send out a command to permit power delivery for an electrical equipment to operate, and when the bolt casing is taken off, the motion sensor is activated to send out a command to cut off a power supply for the electrical equipment or give out an alarm.

9 Claims, 2 Drawing Sheets

(51) Int. Cl.
    *G08B 21/18*     (2006.01)
    *E05B 1/00*     (2006.01)
    *G07C 1/00*     (2006.01)
    *H01H 9/22*     (2006.01)

(56) References Cited

U.S. PATENT DOCUMENTS

| | | | |
|---|---|---|---|
| 8,840,016 B1 * | 9/2014 | Schott et al. | 235/379 |
| 8,902,075 B2 | 12/2014 | Guo et al. | |

FOREIGN PATENT DOCUMENTS

| | | |
|---|---|---|
| CN | 2825869 Y | 10/2006 |
| CN | 201007969 Y | 1/2008 |
| CN | 201188537 Y | 1/2009 |
| CN | 101369724 A | 2/2009 |
| CN | 201226310 Y | 4/2009 |
| DE | 1703037 B1 | 6/1971 |
| DE | 1955743 C3 | 6/1974 |
| EP | 1795676 A3 | 1/2008 |
| GB | 1503327 A | 3/1978 |

OTHER PUBLICATIONS

European Search Report issued for Application No. 09765325.7, dated Apr. 26, 2012 (7 pages).

International Search Report and Written Opinion issued by the U.S. Patent and Trademark Office as International Searching Authority for International Application No. PCT/CN2009/000428 dated Jul. 30, 2009 (24 pages).

* cited by examiner

PRE-COVER-OPENING POWER-OFF METHOD AND APPARATUS

CROSS-REFERENCE TO RELATED APPLICATIONS

This application is a continuation application of U.S. patent Ser. No. 12/996,282, entitled "PRE-COVER-OPENING POWER-OFF METHOD AND APPARATUS," filed on Dec. 3, 2010, to be issued as U.S. Pat. No. 8,902,075 on Dec. 2, 2014, which claims benefit of the PCT Application No. PCT/CN2009/000428, entitled "A METHOD FOR CUTTING OFF A POWER SUPPLY PRIOR TO OPEN A COVER AND AN APPARATUS THEREOF," filed on Apr. 22, 2009, which claims benefit of the Chinese Patent Application No. 200810055240.6, filed on Jun. 19, 2008. Each of the referenced applications is hereby incorporated by reference in its entirety.

FIELD OF THE INVENTION

The present invention relates to a power-off method and apparatus for cutting off a power supply for electrical equipments in coal mines and various flammable and explosive places, and more specifically, relates to a pre-cover-opening power-off method and apparatus.

BACKGROUND OF THE INVENTION

The Coal Mines Safety Regulations provide that, "live maintenance and movement of electrical equipments, cables and wires are prohibited underground". However, in practical operations, live maintenance frequently occurs due to a lack of the facilities guarantees, causing countless coal mine accidents. In order to solve this problem, Chinese Patent No. 200710010531.9, titled "Integrative Protection Device and Method for Mineral Grading Lockout Explosion Suppression Vacuum Electromagnetic Starter", and Chinese Patent No. 200520023343.6, titled "Power-off Upon Cover-Opening Safety Protector for Explosion-Proof Electrical Device", have proposed two solutions, but both solutions realize automatic power-off upon opening a cover, and cannot cut off the power supply prior to opening a cover.

SUMMARY OF THE INVENTION

The present invention intends to provide a pre-cover-opening power-off method and apparatus, which can send out a signal to a safety protecting and monitoring unit to cut off the power supply and give out an alarm before screwing off a screw on a cover plate of an electrical equipment, to thereby solve the problems as to the accidents of gas explosion and casualties that are caused by live operation.

The present invention is implemented with the following technical solution:

A pre-cover-opening power-off method, comprising the steps of: (a) fixing a bolt casing to a bolt, (b) connecting a motion sensor to a safety protecting and monitoring unit in a wired or wireless manner, (c) activating the motion sensor to send out a command to permit power delivery for an electrical equipment to operate, and when the bolt casing is taken off, the motion sensor is activated to send out a command to cut off a power supply for the electrical equipment or give out an alarm. The step (a) of fixing the bolt casing to the bolt is realized in the following manner: operating a key and a lock core or a fastening screw to enter an annular locking slot of the bolt with a distance sleeve so as to fix the bolt casing, or fixing the bolt casing to the bolt through threaded connection, or fixing the bolt casing to the bolt by pinning, or locking the bolt casing to the bolt. The step (c) of activating the motion sensor is realized in the following manner: when the bolt casing is fixed to the bolt, a bolt head or the distance sleeve or an electrical equipment cover plate is pressed against a motion sensor rod, and a contact is closed or opened, whereby a signal is sent out to the safety protecting and monitoring unit; when the bolt casing is taken off, the motion sensor rod leaves the bolt head or the distance sleeve or the electrical equipment cover plate, and the contact is opened or closed, whereby a signal is sent out to the safety protecting and monitoring unit, or the motion sensor is activated to send out a signal to the safety protecting and monitoring unit when the key and the lock core are operated.

A pre-cover-opening power-off apparatus with a lock, comprising an electrical equipment cover plate 1, a bolt casing with a lock 2, a key 3, a lock core 4, a bolt 5, a motion sensor 9, and a safety protecting and monitoring unit 10. The electrical equipment cover plate 1 is connected to the bolt casing with a lock 2 by means of the bolt 5. The key 3 and the lock core 4 are provided inside a hole on one side of the bolt casing with a lock 2. A locking screw 11 is provided inside a hole on the other side of the bolt casing with a lock 2. The motion sensor 9 with a motion sensor rod 8 is provided inside a hole in an upper portion of the bolt casing with a lock 2. The motion sensor 9 is connected to the safety protecting and monitoring unit 10. A lower end of the motion sensor rod 8 is pressed against a bolt head of the bolt 5. The bolt 5 is jacketed with a distance sleeve 7. The distance sleeve 7 is cushioned with a spring washer 6 thereunder. The distance sleeve 7 is provided with an annular locking slot, and the annular locking slot is connected to the lock core 4. The bolt casing is a bolt casing with a lock or a bolt casing without a lock, or a frame or a pin that is mounted on the bolt and can block the screwing of the bolt.

As compared with the prior art, the present invention has the following beneficial effects: operators can be effectively prevented from live operations during equipment overhaul, and before opening the electrical equipment cover plate, a signal can be sent out to the safety protecting and monitoring unit, to cut off the power supply and give out an alarm, thereby realizing pre-cover-opening power-off. The present invention can be widely applied to electrical equipments at various flammable and explosive places such as coal mines and flammable and explosive workshops, for guaranteeing the safety of overhaul operators.

BRIEF DESCRIPTION OF THE ACCOMPANYING DRAWINGS

BEST MODE FOR CARRYING OUT THE INVENTION

A detailed description of a pre-cover-opening power-off method is given below with reference to the four types of pre-cover-opening power-off apparatuses.

Embodiment 1

Figure 1:
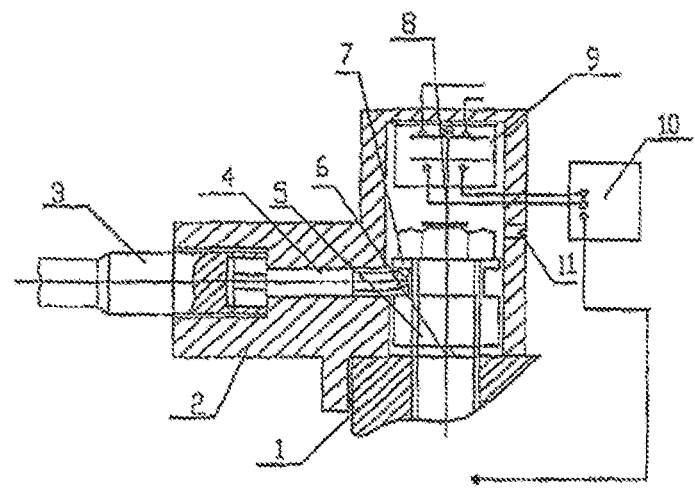
FIG. 1 illustrates schematically the structure of a pre-cover-opening power-off apparatus with a lock as described in Embodiment 1.

FIG. 1 shows a pre-cover-opening power-off apparatus with a lock, which comprises an electrical equipment cover plate 1, a bolt casing with a lock 2, a key 3, a lock core 4, a bolt 5, a spring washer 6, a distance sleeve 7, a motion sensor rod 8, a motion sensor 9, a safety protecting and monitoring unit 10, and a locking screw 11. The electrical equipment cover plate 1 is connected to the bolt casing with a lock 2 by means of the bolt 5. The key 3 and the lock core 4 are provided inside a hole on one side of the bolt casing with a lock 2, and the locking screw 11 is provided inside a hole on the other side of the bolt casing with a lock 2. The motion sensor 9 with the motion sensor rod 8 is provided inside a hole in an upper portion of the bolt casing with a lock 2. The motion sensor 9 is connected to the safety protecting and monitoring unit 10. A lower end of the motion sensor rod 8 is pressed against a bolt head of the bolt 5. The bolt 5 is jacketed with the distance sleeve 7. The distance sleeve 7 is cushioned with the spring washer 6 thereunder. The distance sleeve 7 is provided with an annular locking slot, and the annular locking slot is connected to the lock core 4.

A pre-cover-opening power-off method comprises the steps of: the lock core is operated by means of a key to enter the annular locking slot of the bolt with the distance sleeve, so as to fix the bolt casing to the bolt, wherein the bolt head is pressed against the motion sensor rod, a normally closed contact is opened and a normally opened contact is closed, whereby a signal is sent out to the safety protecting and monitoring unit, and the safety protecting and monitoring unit sends out a command to permit power delivery for the electrical equipment to operate; when the lock core is operated by means of the key to exit the annular locking slot of the bolt with the distance sleeve, the bolt casing is taken off, the bolt head leaves the motion sensor rod, the normally closed contact is closed and the normally opened contact is opened, whereby the motion sensor sends out a signal to the safety protecting and monitoring unit, or alternatively, the bolt head leaves the motion sensor rod when the key and the lock core are made to exit, the motion sensor sends out a signal to the safety protecting and monitoring unit, and the safety protecting and monitoring unit in communication with the motion sensor sends out a command to cut off a power supply for the electrical equipment or give out an alarm.

The operation process is described as follows. A screw which was originally fastened on the electrical equipment cover plate 1 is screwed off and replaced with a suitably sized bolt 5, and the distance sleeve 7 is screwed on. Alternatively, it is also possible to make the distance sleeve 7 and the bolt 5 into a bolt assembly with a distance sleeve. The long fastening bolt with the distance sleeve 7, having been provided with the spring washer 6, is screwed into the electrical equipment cover plate 1 and is tightened up. Then, the bolt is covered with the bolt casing with a lock 2. The lock core 4 is operated by means of the key 3 to enter the annular locking slot, so as to fix the bolt casing with a lock 2. The bolt head of the bolt 5 is pressed against the motion sensor rod 8, the normally closed contact is opened and the normally opened contact is closed, thereby a signal is sent out, and the safety protecting and monitoring unit sends out a command to permit power delivery. When the electrical equipment is to be overhauled, only professional personnel can unlock the lock core 4 with a specific key 3 and take off the bolt casing with a lock 2, so that the normally closed contact is closed and the normally opened contact is opened, and the safety protecting and monitoring unit 10 sends out a power-off command to the electrical equipment and gives an alarm, thereby cutting off the power supply before opening the cover for overhaul. After the bolt casing with a lock 2 is taken off, the locking screw 11 is screwed off to obstruct the motion sensor rod 8 from moving, thereby preventing the motion sensor rod 8 from misacting and sending out an erroneous signal due to some reason. Only professional personnel can unlock this bolt casing with a lock by means of the key 3 and take off the bolt casing with a lock 2, thereby to cut off the power supply in advance for performing an overhaul. As for non-professional personnel, due to lack of the key 3, they cannot take off the bolt casing with a lock 2 and cannot cut off the power supply for performing examination.

The motion sensor 9 may also be mounted in a hole at a side portion of the bolt casing with a lock 2, so that the motion sensor rod 8 can contact the bolt 5 or the distance sleeve 7. When the bolt 5 is covered with the bolt casing with a lock 2, the bolt 5 or the distance sleeve 7 activates the motion sensor rod 8, the normally closed contact is opened, thereby enabling power delivery; when the cover is to be opened to cause the bolt casing with a lock 2 to leave the bolt 5, the bolt 5 or the distance sleeve 7 leaves the motion sensor rod 8, the normally closed contact is closed, and a signal is sent to the safety protecting and monitoring unit 10 to cut off a power supply for the switch.

The motion sensor 9 may also be mounted in a hole in a lower portion of the bolt casing with a lock 2, so that the motion sensor rod 8 can contact the electrical equipment cover plate 1. When the bolt 5 is covered with the bolt casing with a lock 2, the electrical equipment cover plate 1 activates the motion sensor rod 8, the normally closed contact is opened, thereby enabling power delivery; when the cover is to be opened to cause the bolt casing with a lock 2 to leave the bolt 5, the electrical equipment cover plate 1 leaves the motion sensor rod 8, the normally closed contact is closed, and a signal is sent to the safety protecting and monitoring unit 10 to cut off the power supply for the switch.

The motion sensor 9 may also be mounted nearby the key 3 and the lock core 4 inside the bolt casing with a lock 2, so that the motion sensor rod 8 can contact the key 3 or the lock core 4. When the bolt 5 is covered with the bolt casing with a lock 2, the lock core 4 is operated by means of the key 3 and the bolt casing with a lock 2 is locked to the bolt 5. At this time, the key 3 or the lock core 4 activates the motion sensor rod 8, the normally closed contact is opened, thereby enabling power delivery; when the cover is to be opened, the lock core 4 is operated by means of the key 3, the lock core 4 exits the annular locking slot of the distance sleeve 7, the bolt casing with a lock may leave the bolt 5, the key 3 or the lock core 4 leaves the motion sensor rod 8, the normally closed contact is closed, and a signal is sent to the safety protecting and monitoring unit 10 to cut off the power supply for the switch.

The motion sensor 9 may be a switch or a button, or may be a reed switch, wherein a magnetic piece is mounted on the head of the bolt 5, whereby the motion sensor acts upon approaching the bolt head to a certain distance. The motion sensor 9 may also be a touch motion sensor, and the motion sensor acts upon contacting the bolt head. The motion sensor 9 may also be a non-contact motion sensor (such as a Hall element, an optoelectronic motion sensor, or an inductive motion sensor), and the motion sensor acts upon approaching the bolt head to a certain distance. The motion sensor 9 may also be an active element (such as piezoelectric ceramics element, a pressure sensor, a distance testing sensor, a magnetic card reader, or a wireless transceiver, etc.), and the motion sensor sends out a signal upon approaching the bolt head to a certain distance or contacting the bolt head to reach a certain pressure. The motion sensor 9 may also be a magnetic lock, and when the motion sensor approaches the bolt head, the lock is unlocked under a magnetic effect on the bolt head and the motion sensor sends out a signal. The motion sensor may be a switch lock, that is, an electric signal is sent out when the switch is closed, and another electric signal is sent out when the lock is unlocked by operating the lock core by means of a key.

The motion sensor 9 can communicate with the safety protecting and monitoring unit 10 in the following manners: one is that the motion sensor 9 acts, for example, the normally closed contact is closed, thereby a signal is sent out to a mine safety protecting and monitoring unit in a wired or wireless manner, and the mine safety protecting and monitoring unit receives the signal, and gives out an alarm display, or sends out a command to a power supply system to cut off the power supply for the switch; another is that the motion sensor 9 acts, for example, the normally closed contact is closed, thereby a signal is sent out to a leakage protection system in a wired or wireless manner, and the leakage protection system receives a leakage signal and sends out a command to the power supply system to cut off the power supply for the switch.

Embodiment 2

Figure 2:
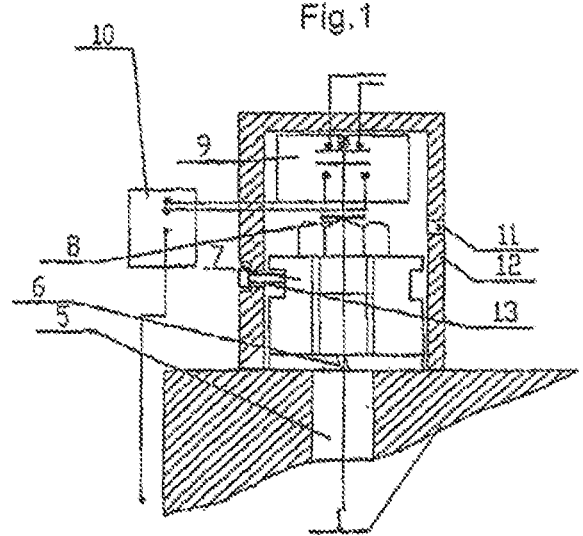
FIG. 2 illustrates schematically the structure of a first type of pre-cover-opening power-off apparatus without a lock described in Embodiment 2.

FIG. 2 shows a first type of pre-cover-opening power-off apparatus without a lock, which comprises an electrical equipment cover plate 1, a bolt casing without a lock 12, a fastening screw 13, a bolt 5, a spring washer 6, a distance sleeve 7, a motion sensor rod 8, a motion sensor 9, a safety protecting and monitoring unit 10, and a locking screw 11. The electrical equipment cover plate 1 is connected to the bolt casing without a lock 12 by means of the bolt 5. The fastening screw 13 is provided inside a hole on one side of the bolt casing without a lock 12. The locking screw 11 is provided inside a hole on the other side of the bolt casing without a lock 12. The motion sensor 9 with the motion sensor rod 8 is provided inside a hole in an upper portion of the bolt casing without a lock 12. The motion sensor 9 communicates with the safety protecting and monitoring unit 10. A lower end of the motion sensor rod 8 is pressed against a bolt head of the bolt 5. The bolt 5 is jacketed with the distance sleeve 7. The distance sleeve 7 is cushioned with the spring washer 6 thereunder. The distance sleeve 7 is provided with an annular locking slot, and the annular locking slot is connected to the fastening screw 13. It is possible to connect the distance sleeve 7 and the bolt casing without a lock 12 via threaded connection, without using the fastening screw 13.

A pre-cover-opening power-off method comprises the steps of: screwing the fastening screw into the annular locking slot of the bolt with the distance sleeve, so as to fix the bolt casing to the bolt with the distance sleeve, or alternatively, directly screwing the bolt casing onto the distance sleeve with threads without using the fastening screw, wherein the bolt head is pressed against the motion sensor rod, the normally closed contact is opened and the normally opened contact is closed, whereby a signal is sent out to the safety protecting and monitoring unit, and the safety protecting and monitoring unit sends out a command to permit power delivery for the electrical equipment to operate; when the fastening screw is made to exit the annular locking slot of the bolt with the distance sleeve, the bolt casing is taken off, the bolt head leaves the motion sensor rod, the normally closed contact is closed and the normally opened contact is opened, the motion sensor sends out a signal to the safety protecting and monitoring unit, the safety protecting and monitoring unit in communication with the motion sensor sends out a command to cut off a power supply for the electrical equipment or gives out an alarm.

Embodiment 3

Figure 3:
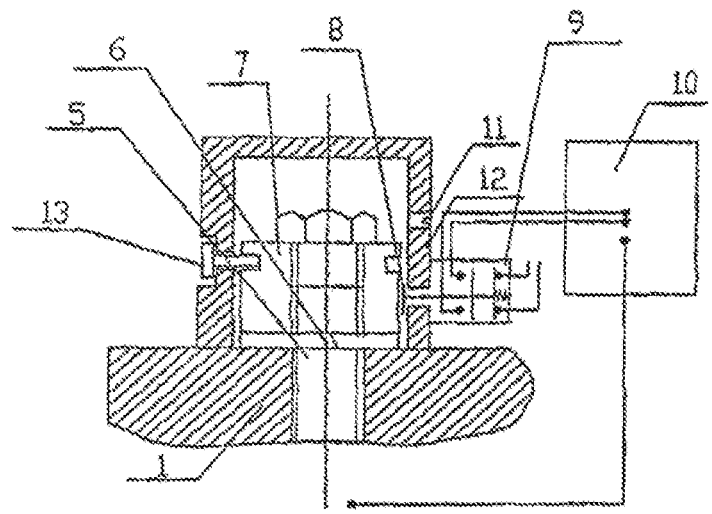
FIG. 3 illustrates schematically the structure of a second type of pre-cover-opening power-off apparatus without a lock described in Embodiment 3.

FIG. 3 shows a second type of pre-cover-opening power-off apparatus without a lock, which comprises an electrical equipment cover plate 1, a bolt casing without a lock 12, a fastening screw 13, a bolt 5, a spring washer 6, a distance sleeve 7, a motion sensor rod 8, a motion sensor 9, a safety protecting and monitoring unit 10, and a locking screw 11. The electrical equipment cover plate 1 is connected to the bolt casing without a lock 12 by means of the bolt 5. The fastening screw 13 is provided inside a hole on one side of the bolt casing without a lock 12. The locking screw 11 is provided in the middle of a hole on the other side of the bolt casing without a lock 12. The motion sensor 9 with the motion sensor rod 8 is provided on a side of the bolt casing without a lock 12. The motion sensor 9 is connected to the safety protecting and monitoring unit 10. The bolt 5 is jacketed with the distance sleeve 7. The distance sleeve 7 is cushioned with the spring washer 6 thereunder. The distance sleeve 7 is provided with an annular locking slot, and the annular locking slot is connected to the fastening screw 13. It is possible to connect the distance sleeve 7 and the bolt casing without a lock 12 via threaded connection, without using the fastening screw 13. A head portion of the motion sensor rod 8 is pressed against the distance sleeve 7 on the bolt 5.

A pre-cover-opening power-off method comprises the steps of: screwing the fastening screw into the annular locking slot of the bolt with the distance sleeve, so as to fix the bolt casing to the bolt with the distance sleeve, the distance sleeve is pressed against the motion sensor rod, the normally closed contact is opened and the normally opened contact is closed, whereby a signal is sent out to the safety protecting and monitoring unit, and the safety protecting and monitoring unit sends out a command to permit power delivery for the electrical equipment to operate; when the fastening screw is made to exit the annular locking slot of the bolt with the distance sleeve, the bolt casing is taken off, the distance sleeve leaves the motion sensor rod, the motion sensor sends out a signal to the safety protecting and monitoring unit, the safety protecting and monitoring unit in communication with the motion sensor sends out a command to cut off a power supply for the electrical equipment or gives out an alarm.

Embodiment 4

Figure 4:
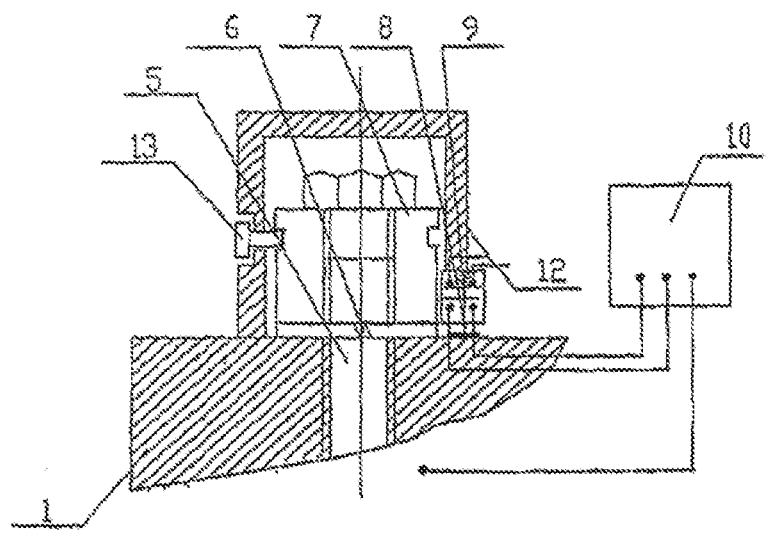
FIG. 4 illustrates schematically the structure of a third type of pre-cover-opening power-off apparatus without a lock described in Embodiment 4.

FIG. 4 shows a third type of pre-cover-opening power-off apparatus without a lock, which comprises an electrical equipment cover plate 1, a bolt casing without a lock 12, a fastening screw 13, a bolt 5, a spring washer 6, a distance sleeve 7, a motion sensor rod 8, a motion sensor 9, and a safety protecting and monitoring unit 10. The electrical equipment cover plate 1 is connected to the bolt casing without a lock 12 by means of the bolt 5. The fastening screw 13 is provided inside a hole on one side of the bolt casing without a lock 12. The motion sensor 9 with the motion sensor rod 8 is provided on a lower portion of the bolt casing without a lock 12. The motion sensor 9 is connected to the safety protecting and monitoring unit 10. The bolt 5 is jacketed with the distance sleeve 7. The distance sleeve 7 is cushioned with the spring washer 6 thereunder. The distance sleeve 7 is provided with an annular locking slot, and the annular locking slot is connected to the fastening screw 13. It is possible to connect the distance sleeve 7 and the bolt casing without a lock 12 via threaded connection, without using the fastening screw 13. A lower end of the motion sensor rod 8 is pressed against the electrical equipment cover plate 1.

A pre-cover-opening power-off method comprises the steps of: screwing the fastening screw into the annular locking slot of the bolt with the distance sleeve, so as to fix the bolt casing to the bolt with the distance sleeve, the electrical equipment cover plate is pressed against the motion sensor rod, the normally closed contact is opened and the normally opened contact is closed, whereby a signal is sent out to the safety protecting and monitoring unit, and the safety protecting and monitoring unit sends out a command to permit power delivery for the electrical equipment to operate; when the fastening screw is made to exit the annular locking slot of the bolt with the distance sleeve, the bolt casing is taken off, the motion sensor rod leave the electrical equipment cover plate, the motion sensor sends out a signal to the safety protecting and monitoring unit, and the safety protecting and monitoring unit in communication with the motion sensor sends out a command to cut off a power supply for the electrical equipment or gives out an alarm.

The operation process of the fourth type of pre-cover-opening power-off apparatus is described as follows. The screw which was originally fastened on the electrical equipment cover plate 1 is screwed off and replaced with a bolt 5, and the distance sleeve 7 is screwed on. The distance sleeve 7 is provided with the annular locking slot. The long fastening bolt with the distance sleeve 7, having been provided with the spring washer 6, is screwed into the electrical equipment cover plate 1 and is tightened up. Then, the bolt is covered with the bolt casing without a lock 12. The fastening screw 13 is provided inside a hole on one side of the bolt casing without a lock 12. The motion sensor 9 with the motion sensor rod 8 is provided on a lower portion of the bolt casing without a lock 12. The motion sensor 9 is connected to the safety protecting and monitoring unit 10, and the fastening screw 13 is tightened up so that the fastening screw 13 enters the annular locking slot, so as to fix the bolt casing without a lock 12, wherein the motion sensor rod 8 is pressed against the electrical equipment cover plate 1, the normally closed contact is opened and the normally opened contact is closed, thereby a signal is sent out, and the safety protecting and monitoring unit sends out a command to permit power delivery. When the electrical equipment is to be overhauled, the fastening screw 13 is unscrewed, the bolt casing without a lock 12 is taken off, the motion sensor rod 8 moves, the normally closed contact is closed and the normally opened contact is opened, thereby a signal is sent out, and the safety protecting and monitoring unit 10 sends out a command to cut off the power supply for the electrical equipment in advance. This pre-cover-opening power-off apparatus can realize pre-cover-opening power-off when non-professional personnel screw off the fastening screw 13, and it can be used in substations and the like with a small population.

The invention claimed is:

1. A pre-cover-opening power-off method, comprising the steps of:
    (a) fixing a bolt casing provided with a motion sensor to a bolt which has been screwed into an electrical equipment cover plate;
    (b) connecting the motion sensor to a safety protecting and monitoring unit in a wired or wireless manner; and
    (c) when the bolt casing is fixed to the bolt, the motion sensor is activated so that the motion sensor sends out a signal, and the safety protecting and monitoring unit, upon receiving the signal, sends out a command to permit power delivery for the electrical equipment to operate; and when the bolt casing is taken off, the motion sensor is activated so that motion sensor sends out another signal, and the safety protecting and monitoring unit, upon receiving the other signal, sends out a command to cut off a power supply for the electrical equipment or give out an alarm.

2. The pre-cover-opening power-off method according to claim 1, wherein the bolt is a bolt with a distance sleeve, and the bolt casing is fixed to the bolt by operating a lock core provided inside a hole at one side of the bolt casing by means of a key to enter an annular locking slot of the bolt with the distance sleeve.

3. The pre-cover-opening power-off method according to claim 1, wherein the bolt is a bolt with a distance sleeve, and the bolt casing is fixed to the bolt by operating a fastening screw provided inside a hole at one side of the bolt casing to enter an annular locking slot of the bolt with the distance sleeve.

4. The pre-cover-opening power-off method according to claim 1, wherein the bolt casing is fixed to the bolt by threaded connection between the bolt casing and the bolt.

5. The pre-cover-opening power-off method according to claim 1, wherein the bolt casing is fixed to the bolt by pinning-fixing the bolt casing to the bolt.

6. The pre-cover-opening power-off method according to claim 1, wherein when the bolt casing is fixed to the bolt, a bolt head is pressed against a motion sensor rod, a normally opened contact is closed and a normally closed contact is opened, whereby a signal is sent out to the safety protecting and monitoring unit; when the bolt casing is taken off, the motion sensor rod leaves the bolt head, the normally opened contact is opened and the normally closed contact is closed, whereby a signal is sent out to the safety protecting and monitoring unit.

7. The pre-cover-opening power-off method according to claim 1, wherein when the bolt casing is fixed to the bolt, a distance sleeve is pressed against a motion sensor rod, a normally opened contact is closed and a normally closed contact is opened, whereby a signal is sent out to the safety protecting and monitoring unit; when the bolt casing is taken off, the motion sensor rod leaves the distance sleeve, the normally opened contact is opened and the normally closed contact is closed, whereby a signal is sent out to the safety protecting and monitoring unit.

8. The pre-cover-opening power-off method according to claim 1, wherein when the bolt casing is fixed to the bolt, the electrical equipment cover plate is pressed against a motion sensor rod, a normally opened contact is closed and a normally closed contact is opened, whereby a signal is sent out to the safety protecting and monitoring unit; when the bolt casing is taken off, the motion sensor rod leaves the electrical equipment cover plate, the normally opened contact is opened and the normally closed contact is closed, whereby a signal is sent out to the safety protecting and monitoring unit.

9. The pre-cover-opening power-off method according to claim 1, wherein when the bolt is covered with the bolt casing, a key and a lock core are operated to activate a motion sensor rod, a normally opened contact is closed and a normally closed contact is opened, whereby a signal is sent out to the safety protecting and monitoring unit; when the bolt casing is taken off, at the same time of unlocking by operating the lock core by means of the key, the motion sensor rod is activated to leave, the normally opened contact is opened and the normally closed contact is closed, whereby a signal is sent out to the safety protecting and monitoring unit.

* * * * *